United States Patent [19]

Couto et al.

[11] Patent Number: 5,208,427
[45] Date of Patent: May 4, 1993

[54] CONNECTOR FOR TERMINATING ELECTRICAL CABLE ASSEMBLIES OF MULTIPLE CONFIGURATIONS

[75] Inventors: Luis R. Couto, Hillside; Jaspal S. Bawa, Neshanic Station; Giacomo F. Mancini, Piscataway, all of N.J.; Marc Brodeur, Iberville, Canada

[73] Assignee: Thomas & Betts Corporation, Bridgewater, N.J.

[21] Appl. No.: 830,407

[22] Filed: Jan. 31, 1992

[51] Int. Cl.⁵ .......................................... H02G 3/22
[52] U.S. Cl. .................... 174/65 SS; 439/462
[58] Field of Search .......... 174/65 SS; 439/461, 439/462, 583, 584; 285/161

[56] References Cited

U.S. PATENT DOCUMENTS

| | | | |
|---|---|---|---|
| 2,788,992 | 4/1957 | De Vienne et al. | 285/158 |
| 3,079,182 | 2/1963 | Appleton | 285/343 |
| 3,485,517 | 12/1969 | Howe | 285/341 |
| 3,567,843 | 3/1971 | Collins et al. | 174/51 |
| 3,617,614 | 11/1971 | Henry | 174/77 |
| 3,700,268 | 10/1972 | Nielsen, Jr. | 285/55 |
| 3,739,076 | 6/1973 | Schwartz | 174/78 |
| 3,761,601 | 9/1973 | Kaesser et al. | 174/52 |
| 3,819,849 | 6/1974 | Baker | 174/86 |
| 4,198,537 | 4/1980 | Mariani | 174/65 |
| 4,225,162 | 9/1980 | Dola . | |
| 4,273,405 | 6/1981 | Law . | |
| 4,293,151 | 10/1981 | Manzel | 285/161 |
| 4,334,121 | 6/1982 | Kutnyak | 174/68 |
| 4,481,697 | 11/1984 | Bachle | 24/135 |
| 4,490,576 | 12/1984 | Bolante et al. | 174/65 |
| 4,493,522 | 1/1985 | Law . | |
| 4,513,172 | 4/1985 | Matsui | 174/65 |
| 4,515,991 | 5/1985 | Hutchison | 174/65 |
| 4,549,037 | 10/1985 | Bawa et al. | 174/65 |
| 4,580,865 | 4/1986 | Fryberger . | |
| 4,583,811 | 4/1986 | McMills . | |
| 4,606,562 | 8/1986 | Saraceno | 285/159 |
| 4,608,454 | 8/1986 | Lackinger | 174/65 |
| 4,629,825 | 12/1986 | Lackinger | 174/65 |
| 4,692,561 | 9/1987 | Nattel | 174/65 |
| 4,692,562 | 9/1987 | Nattel | 174/65 |
| 4,692,563 | 9/1987 | Lackinger | 174/65 |
| 4,738,636 | 4/1988 | Bolante | 439/462 |
| 4,739,126 | 4/1988 | Gutter et al. | 174/65 |
| 4,953,898 | 9/1990 | Jorgensen et al. | 285/340 |
| 5,059,747 | 10/1991 | Bawa et al. | 174/65 |

FOREIGN PATENT DOCUMENTS

| | | |
|---|---|---|
| 621092 | 5/1961 | Canada . |
| 0039862 | 11/1981 | European Pat. Off. . |
| 1197423 | 7/1970 | United Kingdom . |

Primary Examiner—Harold Broome
Attorney, Agent, or Firm—Robert M. Rodrick; Salvatore J. Abbruzzese

[57] ABSTRACT

A kit of parts is adapted for terminating electrical cable assemblies of the type having plural insulated conductors extending within an insulative jacket. The kit of parts is capable of terminating the cable alone or when enclosed in an outer cable conduit. The kit includes a body or gland, a hollow insert extending within the gland, a gland nut for screw cooperation with the gland and sealing means disposed between the gland nut and the body for providing a cable assembly seal within the insert. The sealing means further comprises cable sealing components and separate conduit sealing components which are used alternatively for sealing either the cable alone or the cable contained within the conduit.

5 Claims, 2 Drawing Sheets

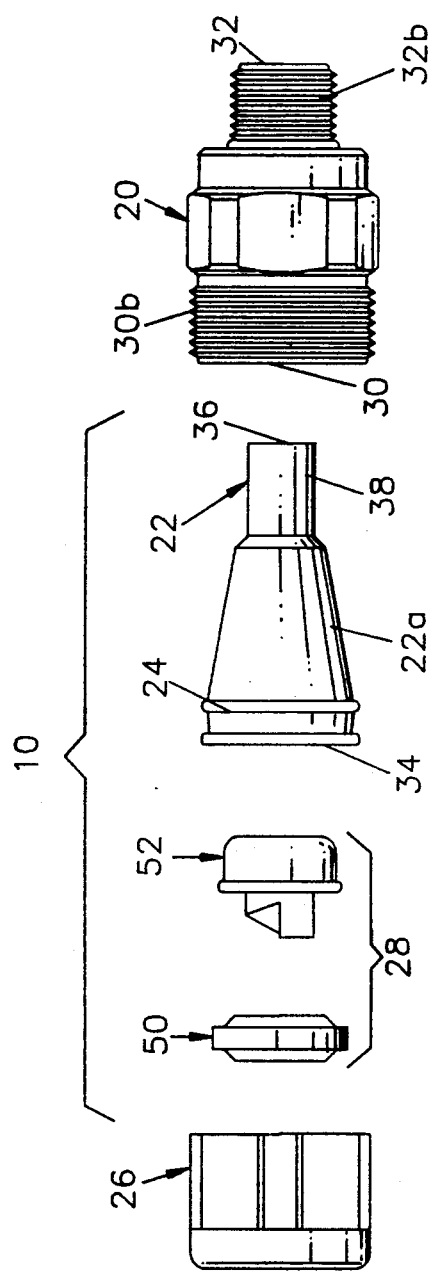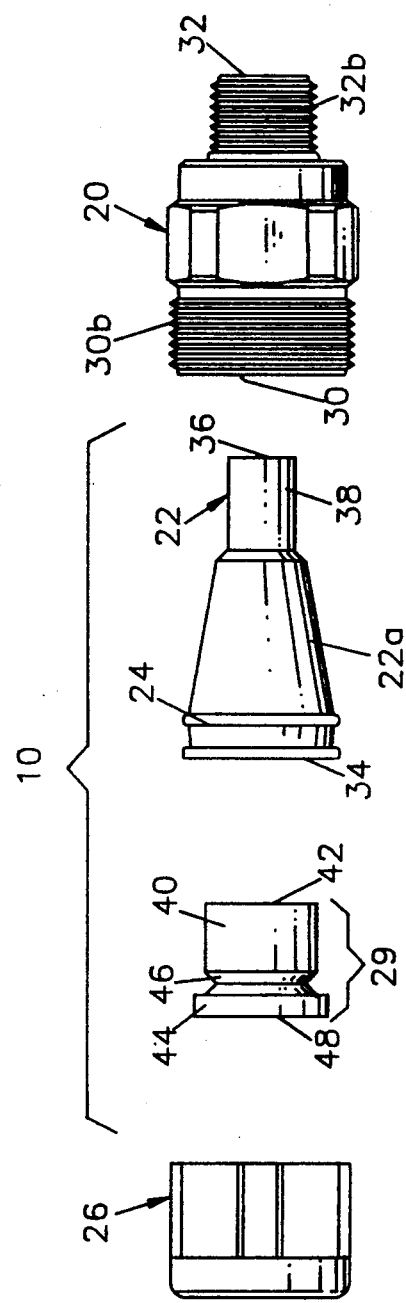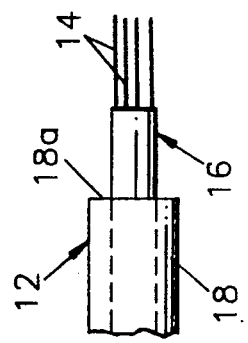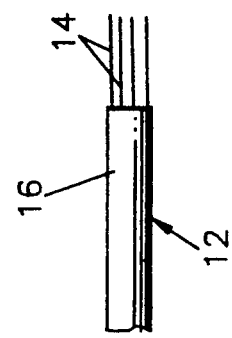

CONNECTOR FOR TERMINATING ELECTRICAL CABLE ASSEMBLIES OF MULTIPLE CONFIGURATIONS

FIELD OF THE INVENTION

This invention relates generally to a connector for terminating electrical cable assemblies. More particularly the present invention relates to a kit of parts adapted for terminating electrical cable assemblies of various configurations.

BACKGROUND OF THE INVENTION

Electrical connectors have long been used to terminate and connect a variety of cables which carry electrical power or signal. Electrical cable assemblies, especially those carrying power, are supplied in various configurations based upon the particular application or location in which the cables are to be used. An electrical cable such as the type which includes plural insulated conductors extending within an insulative jacket may be used in that form or may be used within a protective conduit sheath or cladding.

Various electrical codes such as the National Electrical Code (NEC) outline the specific instances where each type of cable should be employed. When employing a particular cable for a specific use, code-approved connectors must also be employed. Thus it may be appreciated there is the need to produce a multiplicity of connectors so that each type of electrical cable assembly can be terminated in a code approved manner. An electrical wiring installer needs to have available a variety of cable types for different applications. However, this also necessitates the installer to possess multiple types of connectors so that each cable type can be properly terminated.

It would be desirable to provide a termination assembly which would permit the proper termination of plural types of cable thereby reducing the number of different types of connectors an installer must possess at any given time.

SUMMARY OF THE INVENTION

It is therefore an object of the present invention to provide an improved termination assembly for terminating electrical cable assemblies.

It is a more particular object of the present invention to provide a kit of parts adapted for terminating electrical cable assemblies where the cable assemblies may include the cable alone or the cable supported within one or more types of cable conduits.

In the efficient attainment of these and other objects the present invention looks toward providing a kit of parts adapted for terminating electrical cable assemblies. The cable assemblies include insulated conductors extending within an outer jacket. The kit is capable of terminating the cable either alone or when the cable is contained in an outer conduit.

The present invention further includes a body or gland for accommodating the cable assembly, a hollow insert supported within the body permitting passage of the cable assembly therethrough and a gland nut for screw cooperation with the body for securing the cable assembly within the body. Sealing means is included for providing sealed engagement between the cable assembly and the insert. The sealing means further comprises cable sealing components and conduit sealing components which are used alternatively for sealing either the cable alone or the cable contained within the conduit.

As particularly shown by way of preferred embodiment herein the cable sealing components comprise a deformably collapsible bushing extending into the insert which deforms into sealable engagement with the cable jacket upon attachment of the gland nut to the body and an annular retainer positioned between the bushing and the gland nut for providing structural stability to the bushing.

The conduit sealing component includes a conduit end cap for attachment to the end of the conduit extending within the insert and a sealing element positioned adjacent the gland nut for sealable engagement with conduit.

BRIEF DESCRIPTION OF THE DRAWINGS

FIG. 1 shows in exploded plan view, the components of the present invention adapted to terminate an electrical cable supported in an outer conduit.

FIG. 2 shows in exploded plan view, the components of the present invention used to terminate an electrical cable.

Figure 3:
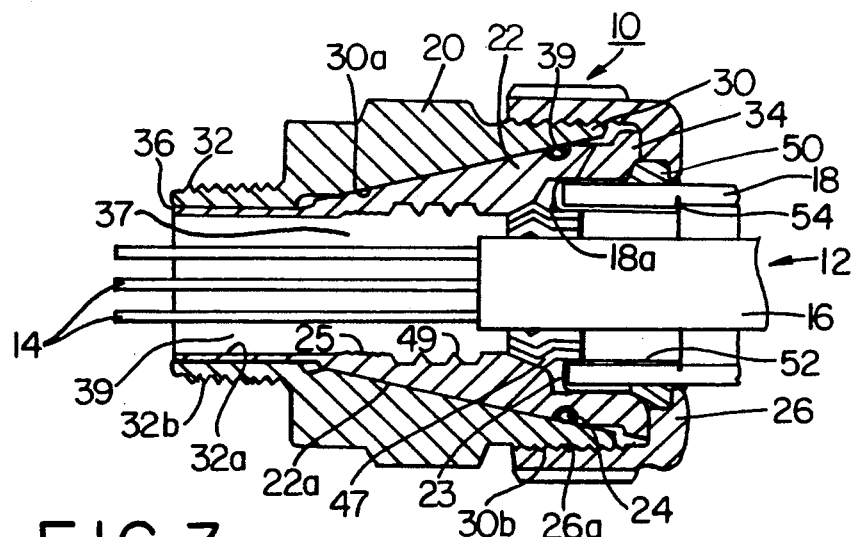
FIG. 3 shows in vertical section the terminated assembly of FIG. 1.

DETAILED DESCRIPTION OF THE PREFERRED EMBODIMENTS:

Referring now to FIGS. 1 and 2 the electrical connector 10 of the present invention is shown. Connector 10 may be used to terminate an electrical cable 12 which includes a plurality of conductors 14 extending within an insulated jacket 16. Cable 12 may be terminated alone, that is, in the condition shown in FIG. 2 or may be terminated when supported within a conduit 18 shown in FIG. 1. Conduit 18 is typically a metallic protective cladding or as described in further detail hereinbelow may be a nonmetallic protective member.

Connector 10 includes a connector body or gland 20, a sleeve 22, an O-ring 24, a gland nut 26 and a sealing assembly 28 and 29 (FIGS. 1 and 2 respectively).

Gland 20, sleeve 22 and gland nut 26 are typically formed of a suitably conductive metal such as aluminum. O-ring 24 is formed a compressible elastomer such as rubber for providing a sealing function as will be described in further detail hereinbelow.

Connector gland 24 is a elongate hollow generally cylindrical member having an enlarged cable receiving portion 30 and a smaller conductor egressing portion 32. Cable receiving portion 30 has a conically tapered bore 30a (FIGS. 3–5) which tapers toward conductor egressing portion 32. A cylindrical bore 32a in communication with bore 30a extends through the conductor egressing portion 32. Bores 30a and 32a are dimensioned so as to receive sleeve 22 therein. The external surface of conductor egressing portion 32 is screw threaded at 32b so as to be screw cooperative with another electrical apparatus for connection thereto. The wider cable receiving portion 30 is also externally screw threaded at 30b so as to cooperate with the internal threads of gland nut 26.

Sleeve 22 which accepts cable 12 is also an elongate generally tubular member being slightly longer than gland 20. Sleeve 22 has a cable receiving end 34 which when in assembled position is adjacent cable receiving portion 30 of gland 20. Sleeve 22 also includes a conductor egressing end 36 adjacent egressing portion 32 of gland 20 and a central passage 37 therebetween. An external surface 22a of sleeve 22 is conically tapered toward egressing end 36. The above-mentioned conical bore 30a of gland 20 is dimensioned so as to accommodate therein conically tapered sleeve 22 with very close interference tolerance. The desired dimensions are such that when seated in bore 30a, sleeve 22 will be force fitted therein. As the length of sleeve 22 is in excess of the length of gland 20, the taper of sleeve 22 will contact the taper of bore 30a to positively seat sleeve 22 therein.

Sleeve 22 also includes a cylindrical extension 38 extending from an edge of conical surface 22a toward egressing opening 36. Extension 38 is typically cylindrical and has a central bore 39 which forms part of central passage 37 through which conductors 14 extend. The outside dimension of extension 38 is such that it fits within bore 32a of gland 20 and extends coaxially with egressing portion 32.

In the presently described embodiment extension 38 extends approximately as far as the end of egressing portion 32 of gland 20. However the extension may be designed to extend beyond egressing portion 32 if desired.

Figure 4:
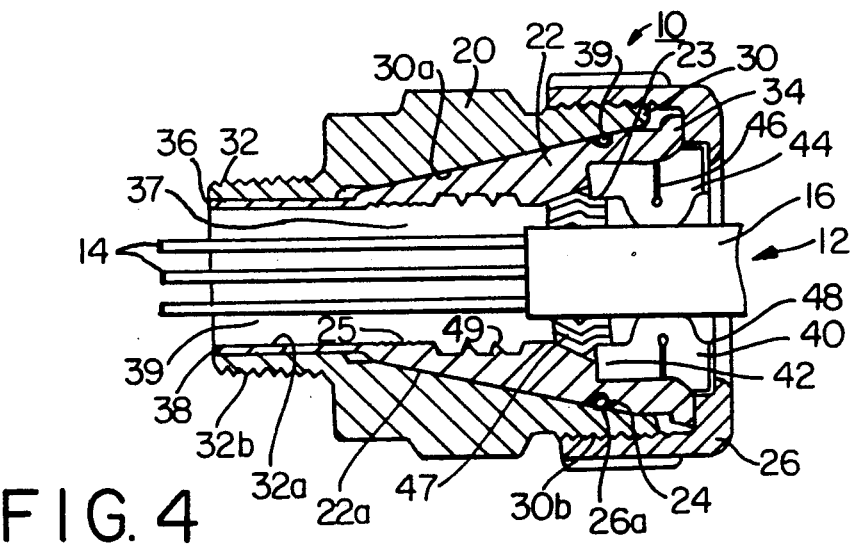
FIG. 4 shows in vertical section the terminated assembly of FIG. 2.
Figure 5:
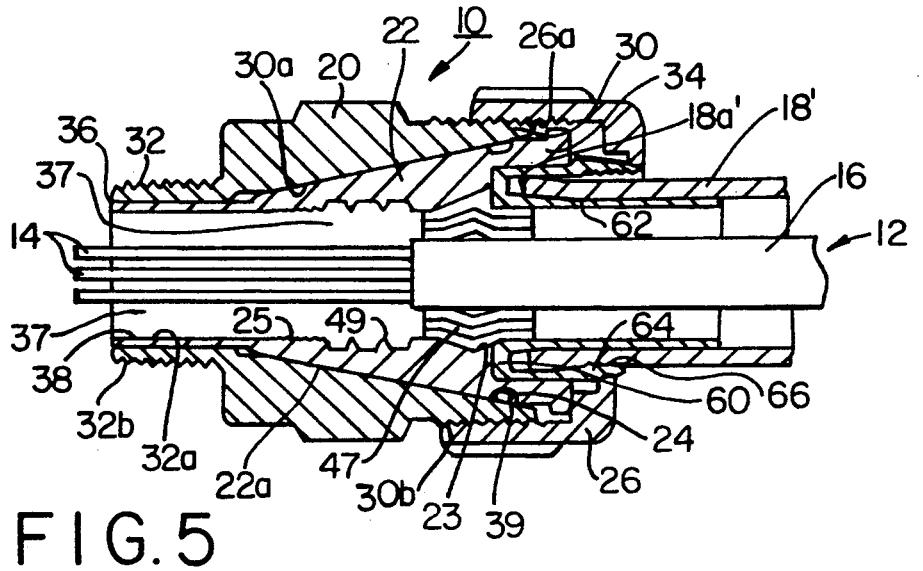
FIG. 5 shows in vertical section a further embodiment of the present invention.

Sleeve 22 further includes, on its external surface 22a, an annular groove 39 positioned adjacent cable receiving opening 34. Annular groove 39 extends circumferentially therearound and seats therein O-ring 24. In preferred form the cross-sectional shape of annual groove in trapezoidal having a narrow outer portion and a wider inner portion so that O-ring 24 will be securely retained within groove 39. Compressible O-ring 24 forms a seal between seated sleeve 22 and gland 20 when attached as shown in FIGS. 3–5. This seal prevents moisture from passing between sleeve 22 and gland 20.

Connector 10 further includes gland nut 26 which is screw attachable to gland 20. Gland nut 26 includes a screw threaded inner surface 26a which cooperates with the external threads 30b of cable receiving portion 30 of gland 20. Gland nut 26 also includes a central opening 27 for slidable engagement over cable 12.

Each of the above described components namely gland 20, sleeve 22, O-ring 24 and gland nut 26 are used to terminate cable 12 either alone as shown in FIG. 2, or including an outer conduit 18. In either case a seal must be provided between connector 10 and cable 12.

As will be described now the components listed above will accommodate both sealing assembly 28 shown in FIG. 1 as well as sealing assembly 29 shown in FIG. 2 which are used respectively with conduit enclosed cable or cable not enclosed in conduit.

Referring now to FIGS. 2 and 4, sealing assembly 29 used in combination with cable 12 not enclosed in conduit may be described.

Sealing assembly 29 includes an elongate generally tubular elastomeric bushing 40 having a forward extent 42 for insertion into sleeve 22 and a rear extent 44 for positioning adjacent gland nut 26. Between forward extent 42 and rear extent 44, bushing 40 includes a central transition extent 46. Transition extent 46 has an area of decreased diameter to provide a readily deformable region between forward extent 42 and rear extent 44. Central extent 46 is compressibly collapsible thereat to provide sealed engagement with jacket 16 of cable 12 as will be described in detail hereinbelow.

Sealing assembly 28 further includes a metallic retainer 48 which has a generally annular configuration. Retainer 48 is positioned between rear extent 44 of bushing 40 and gland nut 26 to provide structural stability for rear extent 44 upon tightening of gland nut 26 onto gland 20.

Having described the components shown in FIGS. 2 and 4, the termination of cable 12 may be described. Cable 12 is inserted through gland nut 26, sealing assembly 28, sleeve 22 and through gland 20. The gland nut 26 is threadingly secured to gland 20. Screw securement thereof urges gland nut 26 against retainer 48 thereby compressibly deforming bushing 40 between gland nut 26 and sleeve 22. As shown particularly in FIG. 4, central extent 46 collapses due to its reduced diameter. Further screw tightening of gland nut 26 to gland 20 urges bushing 40 into sealing contact with jacket 16 of cable 12. This provides an effective seal between connector 10 and cable 12.

Further as shown in FIG. 4, prior to inserting a cable 12 into connector assembly 10, several wraps of adhesive tape 47 may be placed around the jacket 16 adjacent the end thereof. When placed in connector 10 the tape will seat against a tapered inside wall 23 of sleeve 22. In certain environments where an explosion proof connector is desired, sleeve 22 may be filled with a potting compound (not shown) through extension 38. The potting compound will set over time providing an explosion proof seal. The wraps of tape 47 help retain the potting compound prior to its setting. Further, an inside wall 25 of sleeve 22 may include several annual ridges 49 therearound which help seat and retain the potting compound prior to setting.

Referring now to FIGS. 1 and 3 sealing assembly 28 used to terminate cable 12 enclosed in a conduit 18 may be described.

In this embodiment conduit 18 is typically of the flexible metallic type and is used for protection as well as for grounding purposes.

Sealing assembly 28 includes an annular elastomeric sealing element 50 and a metallic conduit end cap 52. Conduit end cap 52 is generally annular in configuration and constructed to fit over the end of 18a of conduit 18. Sealing member 50 is positioned between gland nut 26 and sleeve 22 and is compressibly deformable therebetween to provide a seal upon termination of cable 12 with connector 10.

The termination of cable 12 including conduit 18 with connector 10 may now be described.

Cable 12 including conduit 18 is inserted through gland nut 26 and sealing member 50. The conduit end cap 52 is placed over the end 18a of conduit 18 and includes grounding ridges 54 which dig into the inside wall of conduit 18 establishing mechanical and electrical engagement therewith. The cable 12 is then inserted through sleeve 22 and into gland 20.

Screw tightening of gland nut 26 onto gland 20 deforms sealing member 50 into sealable engagement with the outside wall of conduit 18. Further screw tightening of gland nut 26 urges sealing member into sealable engagement with sleeve 22 thereby creating an effective seal thereat.

Also metallic end cap 52 is urged against the inside wall 23 of sleeve 22 establishing ground continuity between sleeve 22 and conduit 18 through end cap 52.

As with the embodiment shown in FIG. 4, several wraps of adhesive tape 47 may be placed around cable jacket 16 adjacent the end thereof prior to insertion into connector 10. Thus potting compound may be inserted through the extension 38 of sleeve 22 to make the connector 10 explosion proof.

A further embodiment of the present invention is shown in FIG. 5. It is contemplated that the present invention may also be employed with cable enclosed in conduit where the conduit is of the non-metallic variety. In these instances the sealing assembly takes the form of a resilient plastic end cap 60.

End cap 60 is an elongate member designed for insertion over an end 18a' in non-metallic conduit 18'. End cap 60 has a first portion 62 which is inserted into conduit 18' and a second portion 64 designed to extend over the outside of conduit 18'. An edge of second portion 64 includes gripping fingers 66 which grip onto conduit 18'.

As shown in the lower half of the drawing of FIG. 5, screw tightening of gland nut 26 onto gland 20 urges and second portion 64 of end cap 60 into sealable engagement with non-metallic conduit 18'. Gripping fingers 66 help provide a seal and also mechanically secure conduit 18' to connector 10.

It thus can be seen that connector 10 of the present invention provides for the termination of various types of electrical cable with one type of connector. The only interchangeable parts provided are the components forming the sealing member. It is contemplated that connector assembly 10 may be provided to the field with only minimal extra parts and yet terminate a wide variety of cables currently being used.

Having described the preferred embodiment of connector assembly herein, it can be appreciated that variations may be made thereto without departing from the contemplated scope of the invention. As such, the preferred embodiment described herein is intended to be illustrative rather than limiting, the true scope of the invention being set forth in the claims appended hereto.

We claim:

1. A kit of parts adapted for terminating an electrical cable assembly including a cable having plural insulated conductors extending within an insulative jacket, said kit being capable of terminating said cable alone or when said cable assembly includes said cable contained in an outer cable conduit, said kit of parts comprising:
    (a) a body having a cable assembly receiving end, a conductor egressing end and a central cavity extending therethrough;
    (b) a hollow insert extending within said central cavity for permitting accommodation of said cable assembly therein, said insert having an access opening at an end adjacent said cable receiving end of said body;
    (c) a gland nut for screw cooperative attachment to said body at said cable assembly receiving end for retaining said cable assembly within said body; and
    (d) sealing means adapted for cooperation with said insert and said gland nut for providing a cable assembly seal, said sealing means further comprising cable sealing components and conduit sealing components which are used alternatively for sealing either said cable alone or said cable contained in said conduit.

2. A kit of parts in accordance with claim 1 wherein said cable sealing components comprise an elongate bushing having a first end extending within said access opening of said insert, said insert being adapted for accommodation of said bushing first end, an opposed second end adjacent said gland nut and a deformably collapsible central section for deformable sealable engagement with said cable jacket upon said attachment of said gland nut to said body and;

an annular retainer positioned between said second end of said bushing and said gland nut for providing structural stability to said bushing at said second end.

3. A kit of parts in accordance with claim 1 wherein said conduit sealing components comprise a conduit end cap for attachment to an end of said conduit extending within said access opening of said insert, said insert being further adapted for accommodating said conduit end cap; and a sealing element positioned adjacent said gland nut for sealable engagement with said conduit.

4. A kit of parts in accordance with claim 3 wherein said end cap is a metallic member and said sealing element is an elastomeric member.

5. A kit of parts in accordance with claim 3 wherein said end cap and said sealing element are integrally formed.

* * * * *